US006298282B1

United States Patent
Guldi et al.

(10) Patent No.: US 6,298,282 B1
(45) Date of Patent: Oct. 2, 2001

(54) ROBOT CRASH SENSOR SYSTEM

(75) Inventors: Richard L. Guldi, Dallas; Robin D. Worley, Coppell; Keith W. Melcher, McKinney, all of TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/338,753

(22) Filed: Jun. 23, 1999

Related U.S. Application Data

(60) Provisional application No. 60/091,908, filed on Jul. 7, 1998.

(51) Int. Cl.[7] ....................................................... G06F 19/00
(52) U.S. Cl. ........................... 700/245; 700/246; 340/565; 340/825.15; 340/825.16; 340/825.17; 340/825.22; 901/1; 477/906; 477/907; 74/490.01
(58) Field of Search ....................................... 700/245, 246; 340/522, 531, 539, 565, 825.06, 825.15, 825.16, 825.17, 825.22; 901/1; 477/906, 907; 74/490.01, 490.02

(56) References Cited

U.S. PATENT DOCUMENTS

| 5,202,661 | * | 4/1993 | Everett, Jr. et al. | 340/522 |
| 5,366,896 | * | 11/1994 | Margrey et al. | 436/48 |

OTHER PUBLICATIONS

Lopes et al., A machine learning approach to error detection and recovery in assembly, 1995, IEEE.*
Arai et al., Performance improvement of flexible material handling robot by error detection and replanning, 1997, IEEE.*
Donald, Planning multi–step error detection and recovery strategies, 1988, IEEE.*
Duffy et al., A Societal architecture for robotic applications, 1991, IEEE.*

* cited by examiner

*Primary Examiner*—William A. Cuchlinski, Jr.
*Assistant Examiner*—McDieunel Marc
(74) *Attorney, Agent, or Firm*—Wade James Brady III; Frederick J. Telecky, Jr.

(57) ABSTRACT

A method of detecting object scratching during robotic arm movement of the object. The method includes providing a robotic arm for grasping and placing of an object into a cassette and providing a cassette having an entrance for receiving an object therein. A vibration sensor is placed on at least one of the robotic arm or under the cassette control of the robotic arm is provided in response to a malfunction indication at least one of the vibration sensors. There can further be provided an air flow across the entrance of the cassette with placement of a particle counter at the downstream end of the air flow across cassette entrance, wherein the control of said robotic arm is provided in response to a malfunction indication at least one of the vibration sensors and the particle counter. The control can also be provided in response to both of the vibration sensors or one or both of the vibration sensors and the particle counter. The control can be one or more of making a record of the malfunction, providing an alarm signal or terminating operation of the arm. The object is preferably some form of disc or disc-shaped object.

31 Claims, 1 Drawing Sheet

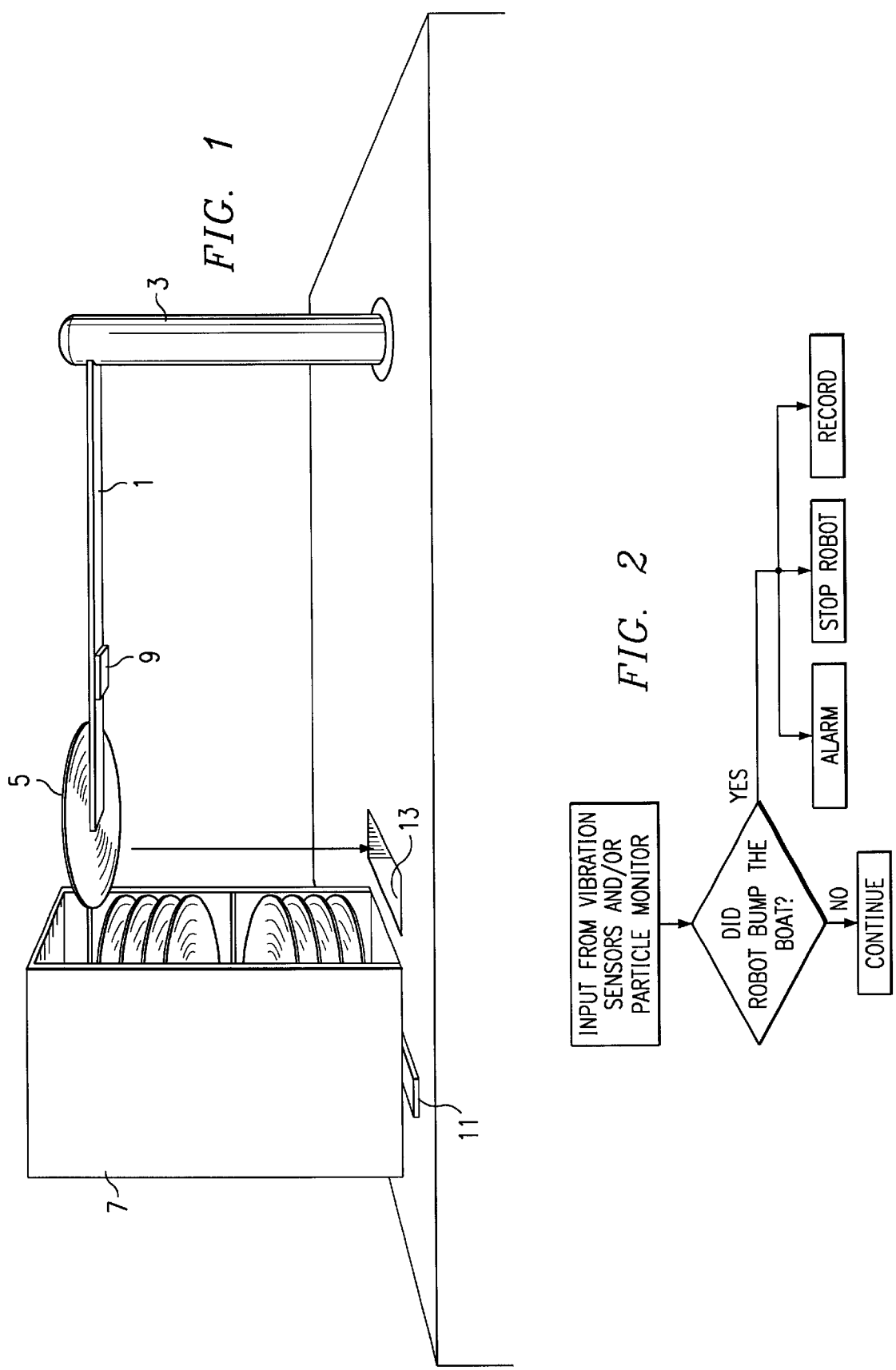

ROBOT CRASH SENSOR SYSTEM

This application claims priority under 35 USC 119(e)(1) of provisional application No. 60/091,908 filed Jul. 7, 1998.

BACKGROUND OF THE INVENTION

1. Field of the Invention

This invention relates to a system for detecting faulty operation of a robot used in fabrication in general and particularly with reference to the fabrication of semiconductor devices, magnetic discs, optical discs and photomasks.

2. Brief Description of the Prior Art

This disclosure relates, in general, to a system for handling product with a robot arm and detecting scratching, rubbing or excessive vibration. While all descriptions herein relate to a semiconductor wafer, it should be understood that the invention has much greater application, such as, for example, in the fabrication of magnetic discs, optical discs and photomasks.

In the fabrication of semiconductor devices, it is necessary to transport semiconductor wafers in and out of cassettes as a part of the fabrication process. This transport is generally performed by the use of robotic arms wherein the arm grasps a semiconductor wafer and moves the wafer from a first location to a second location and, more specifically, in the transport of wafers into and out from a cassette. It is necessary that the path of transport of the wafer during such transport be accurately traveled and that the wafer be accurately oriented during such transport. Otherwise, in the event of, for example, robot misalignment, there is the possibility of the wafer traveling sufficiently out of its assigned path that it bumps into the carrier or scrapes against the cassette or other structure to cause an abrasion on the wafer, a microfracture or even shattering the wafer. This problem leads to diminution in yield and the requirement to stop the fabrication process in order to provide a clean-up of the equipment due to dust from abrasion or wafer particles from abrasion or shattering. Furthermore, the above described problem is only located in the prior art by a visual inspection, this meaning that equipment can run for long periods and produce faulty chips before the problem is noted and the faulty piece of equipment is fixed or replaced. Even when the faulty condition is noted, the system must be completely checked out to locate the faulty equipment. This is difficult in cases where the fault does not occur for every wafer position in the cassette, but only for a few wafer positions, since a service technician may not check every wafer position.

A prior art Kensington wafer sorter system has a robot arm to unload wafers and two light sensors to scan the dimensions and locations of the receiving positions in the cassette before the arm enters the cassette to grasp a wafer. If the cassette is warped or out-of-tolerance, then the out-of-tolerance condition will be detected, and the robot will be prevented from moving. This system, however, does not report the specific position which is out-of-tolerance.

SUMMARY OF THE INVENTION

In accordance with the present invention, the above described problem inherent in prior art fabrication processes using robotic arms is minimized, and there is provided a sensor located at each robotic arm of the system that grasps a wafer whereby some type of history and/or alarm and/or shut off of the fabrication process itself can be provided automatically when a faulty condition occurs, such as, for example, robot arm misalignment, with the location of the faulty condition being immediately noted and reported. The present invention adds to or replaces the prior art by providing the concept of checking of robot vibration during transport of every wafer. The wafer position having a problem is identified whereas the prior art Kensington sorter does not indicate which position has a problem, but only that there is some problem somewhere in the cassette.

Briefly, there is provided one or more of a vibration sensor on the robot arm and/or a vibration sensor on the wafer cassette itself and/or a particle sensor beneath and immediately adjacent the entrance to the wafer cassette to note the extent of particle fall during entry and removal of wafers into and out from the wafer cassette. The sensing equipment can be active continually or only during entry and removal (load/unload) of wafers from the wafer cassette by the robot arm or during motion of the robot arm and wafer through areas of potential jeopardy. In the event of a predetermined abnormal vibration of particle level, operation of the robot arm can be disabled. This operation could take into account the possibility of false alarms and required more than one abnormal event to provide shutdown. Abnormal vibration and/or increased particle count when the robot moves near the cassette indicates scratching jeopardy, can initiate equipment shutdown and provide an alarm. This provides a prewarning of impending robot handling errors and possible wafer damage or scrappage as a result thereof with the warning and possible production stoppage being provided at the first sign of trouble.

Advantages of the system as proposed in accordance with the present invention are ease of implementation, economy in the method of preventing scrap and particle generation, limitation of the error condition to as little as a single wafer and preventing the requirement for lengthy period for yield loss detection by engineering personnel. The system can be in operation of a full time basis or only during periods wherein the robot arm is in operation or only during that part of the robot arm operation during which wafers are grasped and held by the robot arm or when the robot and wafers are passed through regions with potential rubbing jeopardy.

In operation, the normal vibration and particle count are determined to provide a window of normal operation to minimize the likelihood of acting in response to a single or predetermined small number of false readings. A vibration sensor is placed on the robot arm and/or a particle monitor is placed beneath the entry to a cassette or cassette for holding wafers. It is understood that the normal air flow is from ceiling to floor, this causing the air flow passing along the entry to the cassette to be from the top of the cassette to the particle counter at the base of the cassette. A vibration sensor can also be placed beneath the cassette with the cassette resting thereon to sense vibration of the cassette itself The alarm system can be on continually, only when the robot arm is in operation or only when the robot arm is in operation and grasping and holding a wafer. It is preferred that the alarm system be operational only during actual grasping and holding of the wafer to minimize the possibility of a false alarm during robot arm periods of inactivity. The robot arm will then be operated periodically in its normal manner, grasping wafers, placing them into the proper slot in the cassette or grasping wafers in the cassette that have been operated upon and placing these wafers in another location. If, during operation of the robot arm there is sufficient misalignment of the wafer for whatever reason which causes scraping of the wafer by the cassette, the vibration sensor beneath the cassette and/or the vibration sensor on the robot are will note this fact due to vibration of the robot arm and/or the cassette. In addition, if there is scraping of the wafers by the cassette, the particles scraped from the wafer will follow the air steam of the ambient and pass through the particle monitor. The system can be tuned to any one or more of these detectors and provide a record, an alarm and/or shut down the system, based upon some predetermined error criteria or trigger level. When plural ones of the sensors are used concurrently, the indications from these sensors can be used to provide more accurate initial information or for the purpose of redundancy to minimize the likelihood of a false alarm. As an alternative, in the event an error condition is detected and it is determined that the error is due to the vertical positioning of the robot arm, the vertical position of the robot arm can be altered on line until the alarm condition is remedied.

While the invention herein is discussed with respect to vibration sensors on the robot arm and beneath the cassette and with respect to a particle monitor, it should be understood that any type of monitor that can detect a malfunction of the type described hereinabove and provide an indication of such malfunction can be used in place of or in addition to the devices described herein which are utilized for malfunction monitoring.

BRIEF DESCRIPTION OF THE DRAWINGS

FIG. 1 is a schematic diagram of a robot crash sensor system in accordance with the present invention; and FIG. 2 is a flow chart showing operation of the alarm system.

DESCRIPTION OF THE PREFERRED EMBODIMENT

Referring to FIG. 1, there is shown a portion of an enclosed fabrication chamber having ambient air flow from top to bottom. Within the chamber there is disposed a robot arm 1 which is movable in a vertical direction by a controlled arm 3 to align wafers 5 grasped by the arm 1 with a particular level of a cassette or cassette 7. An arm vibration sensor 9 is disposed on the robot arm 1, a cassette vibration sensor 11 is disposed beneath the cassette 7 with the cassette resting on the cassette vibration sensor. An exhaust 13 with a particle monitor therein is disposed below the open end of the cassette 7 with the air flow path being from the top of the cassette to the bottom and to the exhaust whereby any particles emanating from the interior of the cassette will travel downwardly and into the exhaust. The robot arm 1 will initially grasp a wafer 5 with the controlled arm 3 now rotating and fixing the vertical level of the wafer and the robot arm will then move the wafer into the cassette 7. If the wafer 5 is misaligned and scrapes against the cassette 7 or another wafer within the cassette, a vibration will be generated in the robot arm 1 and the cassette. In addition, if the scraping is sufficient to cause particles of the wafer to break off, these particles will travel out of the cassette 7 and along the path of air flow to the exhaust 13. The vibration of the robot arm 1 is detected by the arm vibration sensor 9 and the vibration of the cassette is detected by the cassette vibration sensor 11. The number of particles in the exhaust from the chamber is detected by the particle counter within the exhaust.

As shown in FIG. 2, the detected outputs of the sensors 9 and 11 and counter 13 or of any one or number of these detection devices are input to a standard microprocessor device which determines, based upon a data base provided therein whether or not the robot arm 1 and/or the wafer 5 held by the robot arm bumped the cassette 7 or another wafer withing the cassette. If a determination is made that no bump has taken place, the fabrication process continues unimpeded. On the other hand, if the microprocessor determines that a bump has taken place, this fact can be recorded and/or provide an alarm condition to allow inspection without turn-off of the equipment and/or shut off of the equipment, the level of operation being determined by the status of the data received by the microprocessor.

Though the invention has been described with reference to specific preferred embodiments thereof, many variations and modifications will immediately become apparent to those skilled in the art. It is therefore the intention that the appended claims be interpreted as broadly as possible in view of the prior art to include all such variations or modification.

What is claimed is:

1. A method of detecting object scratching or rubbing during robotic arm movement of the object which comprises the steps of:

(a) providing a robotic arm for grasping and placing of an object into a cassette;

(b) providing a cassette having an entrance for receiving said object therein;

(c) placing a vibration sensor on at least one of said robotic arm or under said cassette; and (d) providing control of said robotic arm in response to a malfunction indication at at least one of said vibration sensors.

2. The method of claim 1 further including providing an air flow across said entrance and placing a particle counter at the downstream end of said air flow across said entrance, wherein said control of said robotic arm is provided in response to a malfunction indication at at least one of said vibration sensors and said particle counter.

3. The method of claim 2 wherein said control is provided in response to at least two of said vibration sensors and said particle counter.

4. The method of claim 3 wherein said control is one of making a record of said malfunction.

5. The method of claim 3 wherein said control is at least one of making a record of said malfunction and providing an alarm signal.

6. The method of claim 3 wherein said control is at least one of making a record of said malfunction, providing an alarm signal and terminating operation of said arm.

7. The method of claim 3 wherein said control is at least two of making a record of said malfunction, providing an alarm signal and terminating operation of said arm.

8. The method of claim 7 wherein said object is a semiconductor wafer.

9. The method of claim 7 wherein said object is a magnetic disc for a memory product.

10. The method of claim 7 wherein said object is an optical disc.

11. The method of claim 7 wherein said object is a photomask.

12. The method of claim 2 wherein said control is one of making a record of said malfunction.

13. The method of claim 2 wherein said control is at least one of making a record of said malfunction and providing an alarm signal.

14. The method of claim 2 wherein said control is at least one of making a record of said malfunction, providing an alarm signal and terminating operation of said arm.

15. The method of claim 2 wherein said control is at least two of making a record of said malfunction, providing an alarm signal and terminating operation of said arm.

16. The method of claim 1 wherein said control is provided in response to both of said vibration sensors.

17. The method of claim 16 wherein said control is provided in response to all of said vibration sensors and said particle counter.

18. The method of claim 16 wherein said control is one of making a record of said malfunction.

19. The method of claim 16 wherein said control is at least one of making a record of said malfunction and providing an alarm signal.

20. The method of claim 16 wherein said control is at least one of making a record of said malfunction, providing an alarm signal and terminating operation of said arm.

21. The method of claim 16 wherein said control is at least two of making a record of said malfunction, providing an alarm signal and terminating operation of said arm.

22. The method of claim 1 wherein said control is one of making a record of said malfunction.

23. The method of claim 1 wherein said control is at least one of making a record of said malfunction and providing an alarm signal.

24. The method of claim 1 wherein said control is at least one of making a record of said malfunction, providing an alarm signal and terminating operation of said arm.

25. The method of claim 1 wherein said control is at least two of making a record of said malfunction, providing an alarm signal and terminating operation of said arm.

26. The method of claim 1 wherein said object is a semiconductor wafer.

27. The method of claim 1 wherein said object is a magnetic disc for a memory product.

28. The method of claim 1 wherein said object is an optical disc.

29. The method of claim 1 wherein said object is a photomask.

30. A method of providing one of an alarm or control for an out-of tolerance plural disc holding cassette which comprises the steps of:

(a) measuring the actual dimensions of said holding cassette;

(b) comparing the measured dimensions of said holding cassette with a known standard;

(c) determining whether at least one of the dimensions of the holding cassette is out-of-tolerance relative to the known standard on a disc by disc basis; and (d) providing an indication of an out-of-tolerance condition and the location of said out-of-tolerance condition.

31. The method of claim 30 further including the step of preventing removal of a disc from said cassette in response to said indication of an out-of tolerance condition.

* * * * *